No. 701,380. Patented June 3, 1902.
F. J. PAHLS.
SAWING MACHINE.
(Application filed Aug. 23, 1901.)
(No Model.)
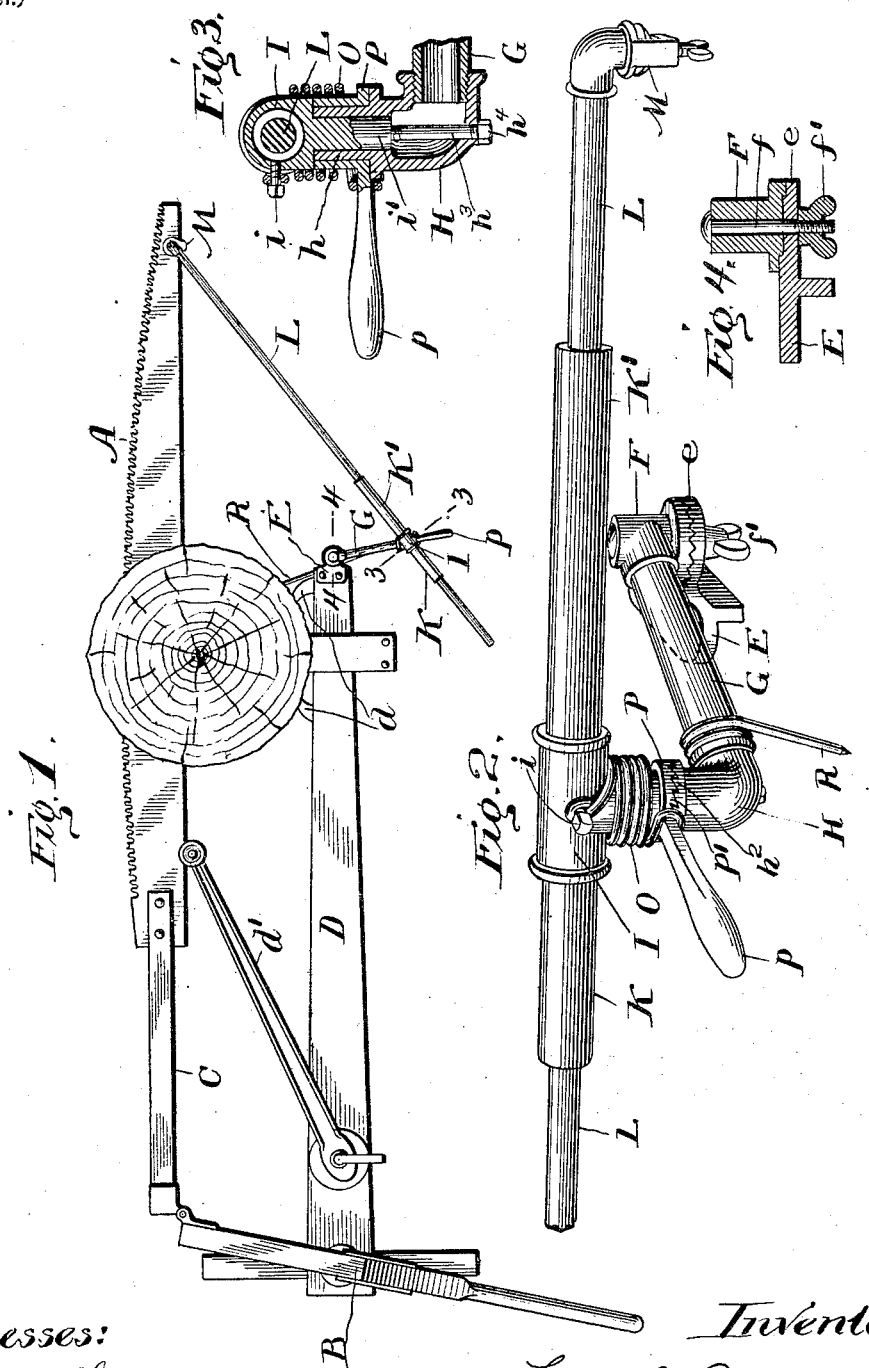
Witnesses:
Chas. C. Sturvey
S. Bliss
Inventor:
Frank J. Pahls
by H. Bitner.
Atty

UNITED STATES PATENT OFFICE.

FRANK J. PAHLS, OF CHICAGO, ILLINOIS.

SAWING-MACHINE.

SPECIFICATION forming part of Letters Patent No. 701,380, dated June 3, 1902.

Application filed August 23, 1901. Serial No. 73,025. (No model.)

*To all whom it may concern:*

Be it known that I, FRANK J. PAHLS, a citizen of the United States of America, residing at Chicago, in the county of Cook and State of Illinois, have invented certain new and useful Improvements in Sawing-Machines, of which the following is a specification.

My invention relates to certain improvements in sawing-machines for sawing down trees or sawing up logs into smaller blocks, the object of the invention being to provide suitable guiding and tension devices for the free end of the saw. In ordinary saws of this class the free end thereof is allowed to sag, which prevents the saw from cutting in a straight line, and thereby increases the friction, making the operation much heavier than when the saw is guided to make a clean cut.

It is the purpose of this invention to obviate these difficulties; and to such end my invention consists in certain novel characteristics, a description of which will be found in the following specification and definitely pointed out in the claims.

The invention is illustrated by means of drawings furnished herewith, in which—

Figure 1 is a plan view of a saw with my improvement applied thereto. Fig. 2 is a perspective view of the guiding and tension device alone. Fig. 3 is a detail vertical section taken in line 3 3 of Fig. 1, and Fig. 4 is a similar section in line 4 4 of Fig. 1.

In the views, A represents a saw-blade, connected to an operating-lever B by a stem or shank C. The lever is pivoted upon a board D, which is clamped to the trees by hooks $d$. A pressure-bar $d'$, pivoted upon the board, gives tension upon the saw upon one side of the tree to force the saw into the cut.

All of the parts thus far described make up a saw of this class; but without the use of my improved guiding device the free end would sag and but poor results would be obtained by its use.

Upon the end of the board D is secured a plate E, having a toothed flange $e$ projecting from its side, and upon this toothed flange rests a similarly-toothed block F, the two being connected together by a bolt $f$ and nut $f'$. By loosening the nut $f'$ the block F can be turned and adjusted upon the flange $e$. From said block projects an arm G, upon the free end of which is an elbow H, having in its upper end a tubular bearing $h$, upon which is rotatively mounted a T-shaped coupling I. In said T-coupling are threaded two pipes K K', forming a guide, in which slides a rod L, provided at its extremities with the clamp M, adapted to be secured to the free end of the saw and adapted to readily engage and disengage the said free end. This clamp may be adjusted along the blade thereof to properly position a supporting-rod with respect to saws of greater or less length, and it may be readily released at any time from the saw-blade to permit the removal of one saw and its replacement by another. The rod L is spring-pressed toward the saw by a spring O, one end of which is secured upon a screw $i$, threaded in the T-coupling I, and the other end of which is secured upon a handle $p$ of an adjusting-collar P, turning upon the bearing $h$ and formed in its lower face with clutch-teeth $p'$, engaging similar teeth $h^2$ upon the elbow H. The T-coupling and elbow are connected together by a pin $h^3$, threaded in the stem $i'$ of the T-coupling and bearing without the elbow a nut $h^4$. By turning the handle $p$ the torsional pressure of the spring O may be varied, and consequently more or less pressure upon the saw, as desired. Also by adjusting the arm G angularly upon the flange $e$ the purchase of the rod L upon the saw may be varied, as the parts may be moved toward or away from the position in which a sort of "toggle" action is obtained by varying the distance of the pivotal point from the saw.

A brace R may be used to support the end of the arm G. As shown, one end of this brace is wrapped around the arm G, and the other is adapted to be thrust into the bark of the tree.

From the above it will be clearly seen that the tendency of the saw to sag at its free end is obviated and that it is properly guided to make a clean cut, which lightens the work of sawing to a great extent, thereby not only saving the saw from injury, but lessening the labor and care attendant upon saws of this class.

I claim as new and desire to secure by Letters Patent—

1. A guide for the saw-blade of sawing-machines, comprising substantially a rod adapted to be secured to the saw-blade, an arm pivoted to the frame of the sawing-machine and adjustable with respect thereto, and a guide pivoted upon said arm and adapted to guide the rod in the plane of the saw-blade; substantially as described.

2. In a sawing-machine, a frame, a saw-blade, means for reciprocating the saw, a bearing upon the frame, a guide pivoted in said bearing, a rod clamped to the saw and sliding in said guide and a spring adapted to exert tension through the medium of said rod, upon the free end of said saw; substantially as described.

3. A device for guiding a saw-blade and applying tension thereto, comprising substantially a bearing, a guide pivoted upon the bearing, a rod sliding in said guide and secured to the saw-blade, a spring engaging the guide and a lever connected to the bearing and engaging said spring and adapted by its rotation to tighten or lessen the tension of said spring; substantially as described.

4. In a sawing-machine, a rod, adapted to support the free end of a saw-blade, a guide for said rod, an arm upon which said guide is pivoted, a lever turning upon said pivot connection between the guide and arm, and having clutch-teeth engaging similar teeth upon the arm and a spring connected to the guide and to the bearing, the rotation of said lever in one direction serving to increase the tension upon the guide; substantially as described.

In witness whereof I have hereunto set my hand, at Chicago, in the county of Cook and State of Illinois, this 20th day of August, A. D. 1901.

FRANK J. PAHLS.

Witnesses:
CHAS. O. SHERVEY,
S. BLISS.